US009447911B2

(12) United States Patent
Ohta et al.

(10) Patent No.: US 9,447,911 B2
(45) Date of Patent: Sep. 20, 2016

(54) ADJUSTABLE FRAME ASSEMBLIES, METHODS FOR ASSEMBLING A FILTER APPARATUS, AND FILTER APPARATUSES

(71) Applicant: Pall Corporation, Port Washington, NY (US)

(72) Inventors: Seiya Ohta, Ithaca, NY (US); Scott W. Osiecki, Skaneateles, NY (US); Todd B. Abernethy, Skaneateles, NY (US)

(73) Assignee: Pall Corporation, Port Washington, NY (US)

( * ) Notice: Subject to any disclaimer, the term of this patent is extended or adjusted under 35 U.S.C. 154(b) by 363 days.

(21) Appl. No.: 14/201,212

(22) Filed: Mar. 7, 2014

(65) Prior Publication Data
US 2015/0252934 A1  Sep. 10, 2015

(51) Int. Cl.
*F16M 1/00* (2006.01)
*B01D 29/52* (2006.01)
*B01D 35/30* (2006.01)

(52) U.S. Cl.
CPC ............... *F16M 1/00* (2013.01); *B01D 29/52* (2013.01); *B01D 35/301* (2013.01); *B01D 35/303* (2013.01); *B01D 35/306* (2013.01); *B01D 61/00* (2013.01); *F16L 3/221* (2013.01);
(Continued)

(58) Field of Classification Search
CPC ........ F16M 1/00; B01D 61/00; B01D 29/52; B01D 35/306; B01D 35/303; B01D 35/301; B01D 2317/04; B01D 2313/06; F16L 3/221; Y10T 29/49826
USPC ................ 210/323.1, 324, 327, 330, 321.79, 210/321.8, 321.88, 321.89, 500.23, 262, 210/241, 231, 228, 230; 211/60.1; 29/428
See application file for complete search history.

(56) References Cited

U.S. PATENT DOCUMENTS 4,479,426 A * 10/1984 Olenfalk .................. B30B 7/02
                                                      100/195
6,913,690 B2 * 7/2005 Mattox .................. B01D 29/03
                                                      210/158
(Continued)

FOREIGN PATENT DOCUMENTS

EP          2 402 070 A1    1/2012
WO    WO 02/094421 A1    11/2002
(Continued)

OTHER PUBLICATIONS

European Patent Office; Extended Search Report in European Patent Application No. 15156705.4 (Jul. 29, 2015).

*Primary Examiner* — Madeline Gonzalez
(74) *Attorney, Agent, or Firm* — Leydig, Voit & Mayer (57) ABSTRACT

An adjustable frame assembly for filter modules includes a lower base arrangement, an upper base arrangement, and an adjustable frame structure connected between the lower and upper base arrangements. Both the lower and upper base arrangements include mounts for positioning and supporting the filter modules. At least one of the base arrangements includes a piping system for supplying fluid to and/or receiving fluid from the filter modules. The adjustable frame structure is moveable between a first position, in which the lower and upper base arrangements are spaced a smaller first distance apart, and a second position, in which the lower and upper base arrangements are spaced a larger second distance apart. Filter modules may be mounted to the adjustable frame assembly when the adjustable frame structure is in the second position to form a filter apparatus.

19 Claims, 7 Drawing Sheets

(52) U.S. Cl.
CPC ...... *B01D 2313/06* (2013.01); *B01D 2317/04* (2013.01); *Y10T 29/49826* (2015.01)

(56) References Cited

U.S. PATENT DOCUMENTS 7,037,426 B2 * 5/2006 Pedersen ................ B01D 61/18
210/257.2

2002/0179517 A1 12/2002 Pedersen

FOREIGN PATENT DOCUMENTS

| WO | WO 2009/048266 A2 | 4/2009 |
| WO | WO 2010/009518 A1 | 1/2010 |
| WO | WO 2010/081228 A1 | 7/2010 |

* cited by examiner

ADJUSTABLE FRAME ASSEMBLIES, METHODS FOR ASSEMBLING A FILTER APPARATUS, AND FILTER APPARATUSES

DISCLOSURE OF THE INVENTION

The present invention relates to adjustable frame assemblies, methods for assembling a filter apparatus, and filter apparatuses. Adjustable frame assemblies embodying the invention may comprise a lower base arrangement, an upper base arrangement, and an adjustable frame structure. The adjustable frame structure is connected between the lower and upper base arrangements and is moveable between a first position and a second position. In the first position, the lower and upper base arrangements are spaced a smaller first distance apart, providing a more compact and easily shippable frame assembly. In the second position, the lower and upper base arrangements are spaced a second greater distance apart. The second distance may correspond to the height of one or more filter modules, allowing the filter modules to be positioned on and supported by the frame assembly. Both the lower and upper base arrangements may include mounts for receiving and supporting an end of the filter modules. At least one of the lower and upper base arrangements may include a piping system for channeling fluid to and/or from an end of the filter modules.

Methods for assembling a filter apparatus according to the invention may comprise moving the adjustable frame structure from the first position to the second position. The adjustable frame structure is connected between the lower and upper base arrangements, and in the first position the lower and upper base arrangements are spaced a first smaller distance apart. In the second position the lower and upper base arrangements are spaced a second larger distance apart, e.g., a distance corresponding to the height of the filter modules. The methods for assembling a filter apparatus further comprise positioning opposite ends of the filter modules in mounts on the lower and upper base arrangements when the adjustable frame structure is in the second position and connecting a piping system on at least one of the lower and upper base arrangements to the filter modules.

Filter apparatuses embodying the invention may comprise a frame assembly and two or more filter modules mounted to the frame assembly. The frame assembly may include lower and upper base arrangements and an adjustable frame structure. Each of the base arrangements may have two or more mounts, and at least one of the base arrangements may have a piping system. The adjustable frame structure has a first position in which the lower and upper base arrangements are spaced a first distance apart and a second position in which the lower and upper base arrangements are spaced a larger second distance apart, the adjustable frame structure being positioned in the second position. The filter modules may have opposite ends and a height corresponding to the second distance. The ends of the filter modules may be positioned in the mounts of the lower and upper base arrangements, and the piping system may be coupled to the filter modules to channel fluid to or from the filter modules.

DESCRIPTION OF EMBODIMENTS OF THE INVENTION

Figure 1:
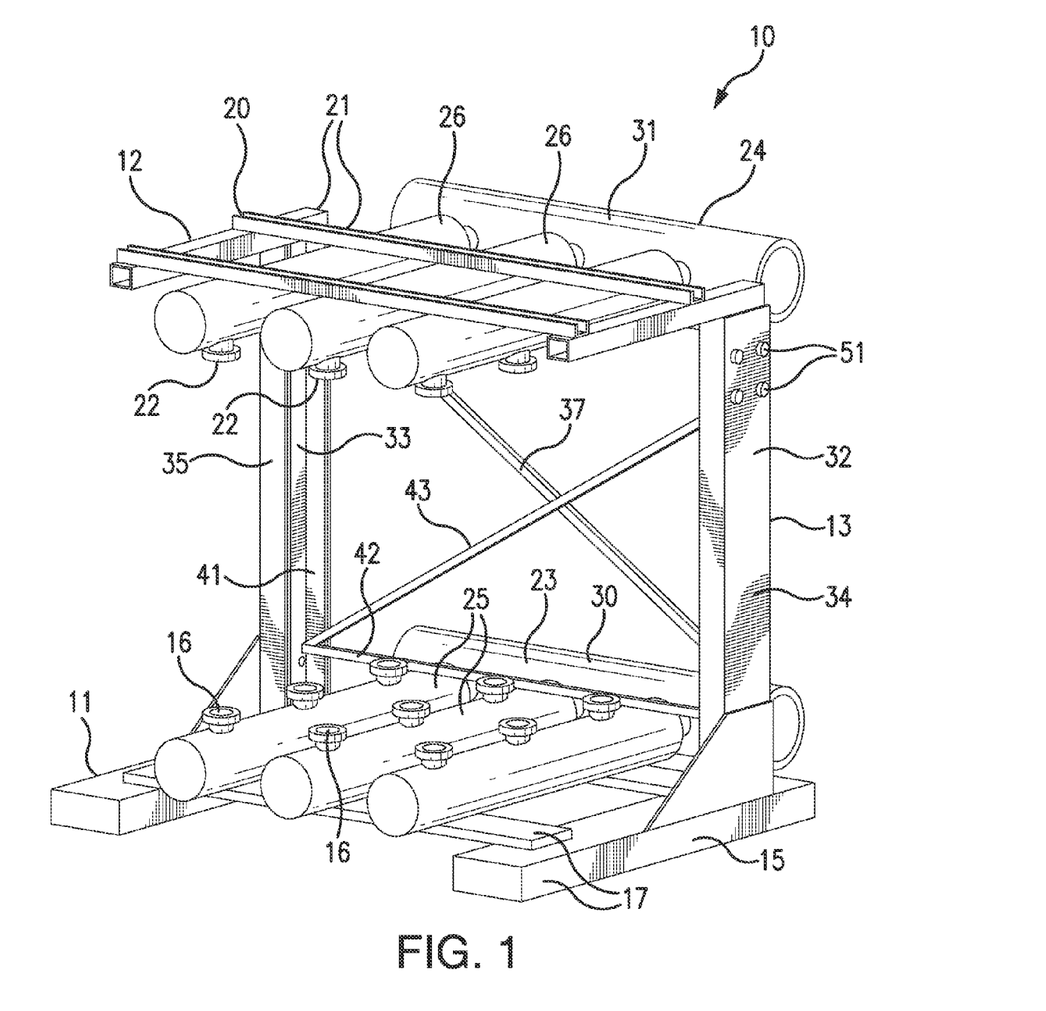
FIG. 1 is a perspective view of an adjustable frame assembly in a first position.
Figure 2:
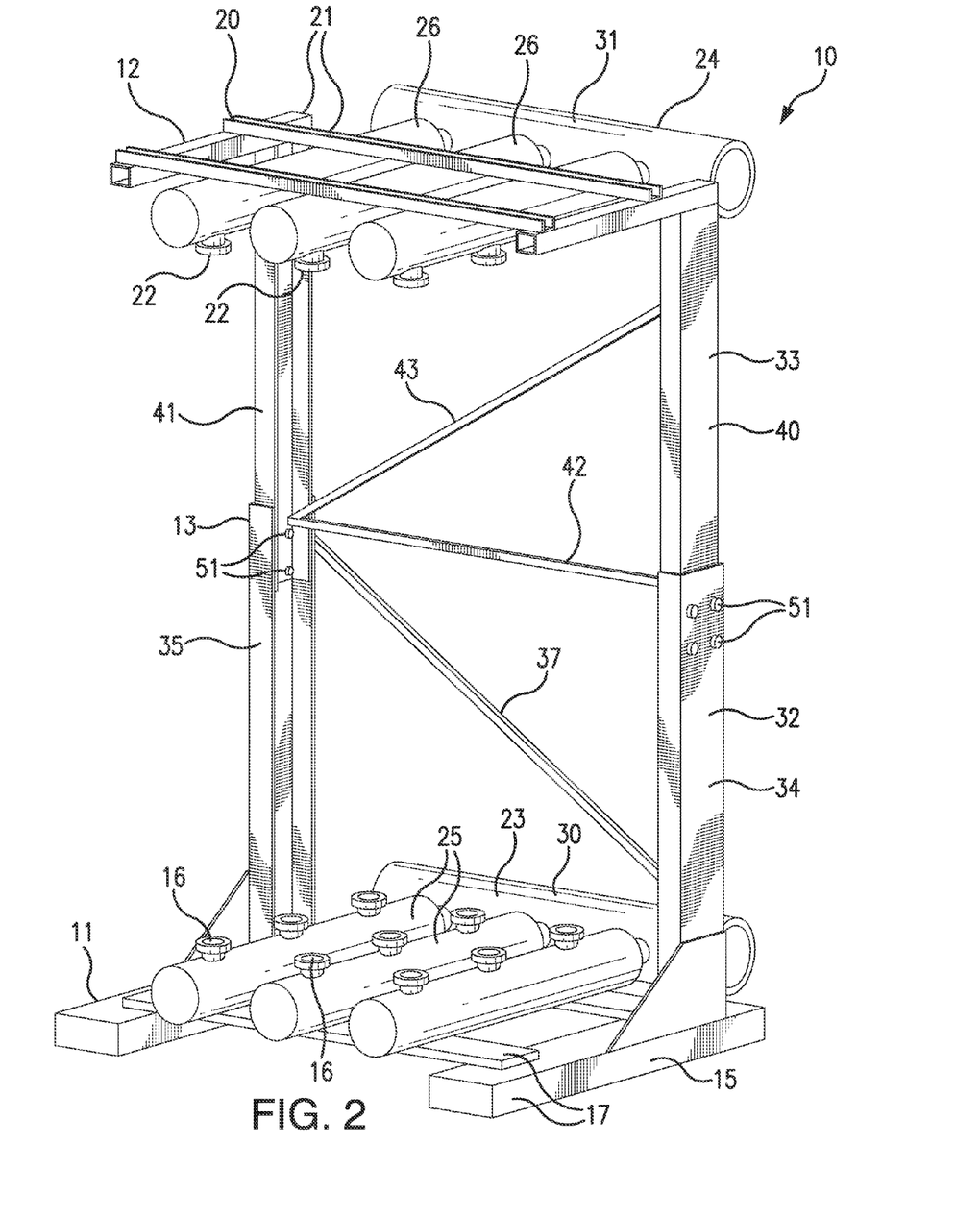
FIG. 2 is a perspective view of the adjustable frame assembly of FIG. 1 in a second position.
Figure 4:
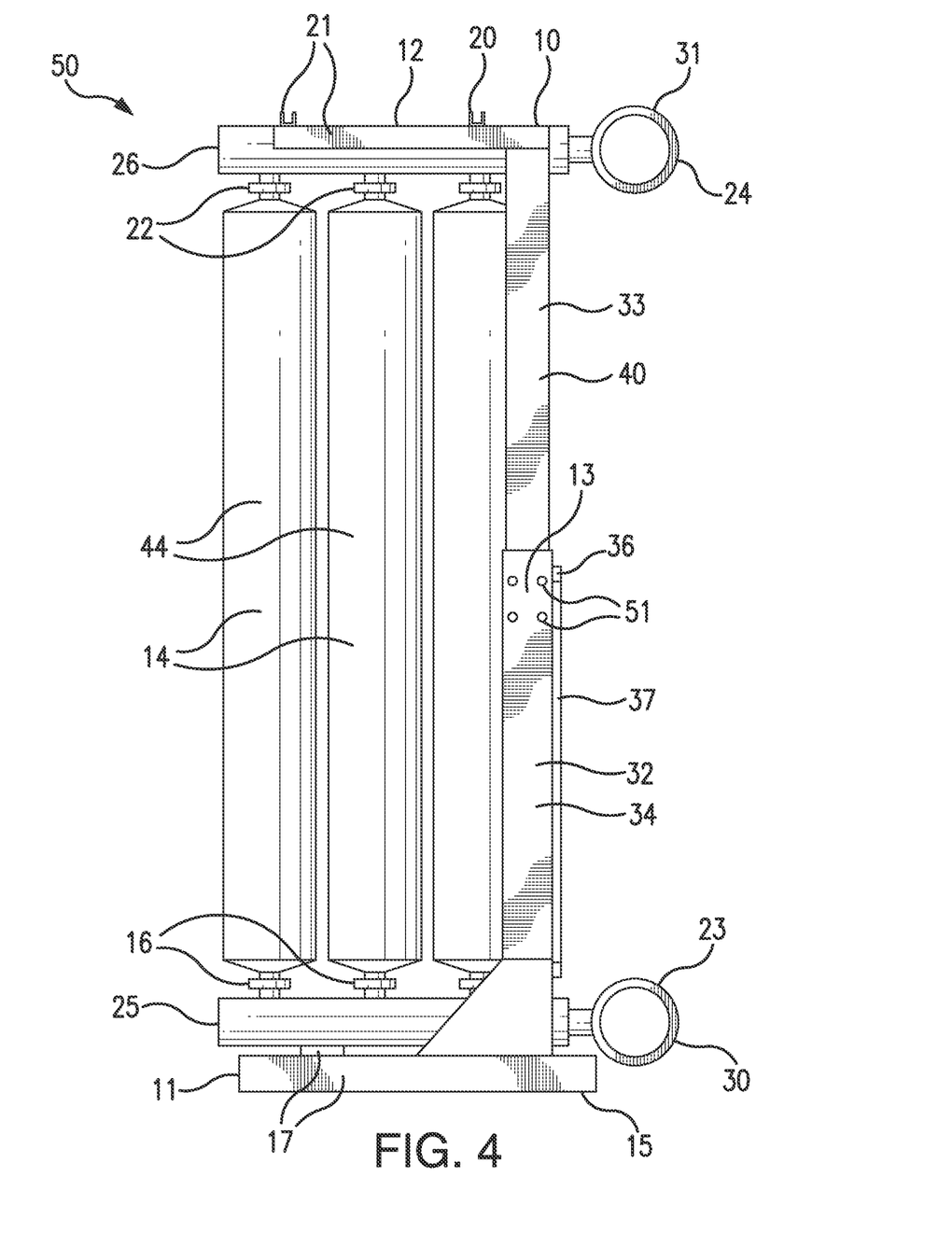
FIG. 4 is a side elevation view of a filter apparatus including the adjustable frame assembly and a plurality of filter modules.
Figure 5:
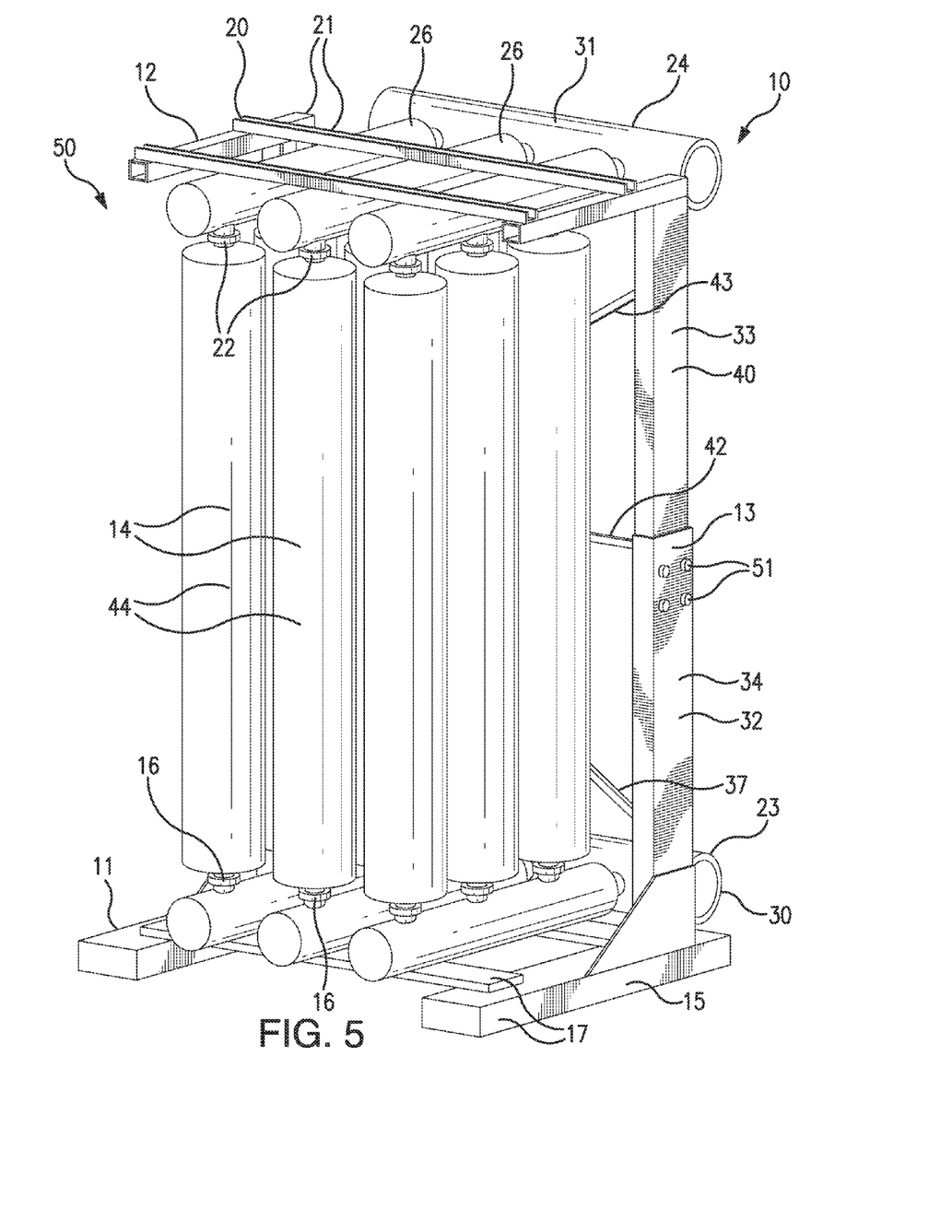
FIG. 5 is a perspective view of the filter apparatus of FIG. 4.

Adjustable frame assemblies embodying the invention may be configured in a wide variety of ways. One of many different examples of an adjustable frame assembly 10 is shown in FIGS. 1 and 2. The adjustable frame assembly 10 generally includes a lower base arrangement 11, an upper base arrangement 12, and an adjustable frame structure 13 connected between the lower and upper base arrangements 11, 12. The adjustable frame structure 13 is moveable between first and second positions. In the first position, the lower and upper base arrangements 11, 12 are spaced a smaller first distance apart, providing a more compact and easily shippable frame assembly 10. In the second position, the lower and upper base arrangements 11, 12 are spaced a larger second distance apart, allowing a plurality of filter modules 14 to be positioned on, and supported by, the frame assembly 10, as shown in FIGS. 4 and 5. The adjustable frame structure may be arranged to move between the first and second positions in any of numerous ways. For example, the adjustable frame structure may move linearly, rotatively, or pivotally between the first and second positions.

The lower base arrangement and the upper base arrangement may be configured in any of numerous ways. Generally, the lower base arrangement 11 may include a lower frame 15 and a plurality of lower mounts 16, as shown in FIGS. 1 and 2. The lower frame 15 may have any of numerous shapes, e.g., a generally rectangular, planar shape, and may be fashioned by attaching lower frame elements 17 to one another, for example, by welds and/or fasteners such as bolts and nuts. The lower frame elements may be variously structured and may be fashioned from a polymeric material or a metal. For many embodiments, the lower frame elements 17 may be steel channel elements welded to one another to form the lower frame 15. The lower mounts 16 may be attached to the lower frame 15, for example, by welds and/or fasteners, either directly or via the piping system. The lower mounts 16 may also be fashioned from a polymeric material or a metal and may be configured in any of numerous ways to position and support the lower ends of the filter modules 14.

The upper base arrangement may be variously configured either similarly to or differently from the lower base arrangement. For example, in the illustrated embodiment, the upper base arrangement 12 may include both an upper frame 20 fashioned from upper frame elements 21 and a plurality of upper mounts 22 for positioning and supporting the upper ends of the filter modules 14, as shown in FIGS. 1 and 2. The upper mounts 22 may be attached to the upper frame 20, for example, by welds or fasteners, either directly or via the piping system. The upper frame 20, the upper frame elements 21, and the upper mounts 21 of the upper base arrangement 12 may be similar to the lower frame 15, the lower frame elements 17, and the lower mounts 16 of the lower base arrangement 11, as previously described.

At least one of the lower and upper base arrangements, or both, may further include a piping system for channeling fluid to or from the filter modules. For example, the piping system may be attached only to the lower base arrangement, or only to the upper base arrangement, to supply and extract fluid from only one end of the filter modules. Alternatively, the piping system may include a lower piping system on the lower frame and an upper piping system on the upper frame. For example, as shown in FIGS. 1 and 2 the piping system may include a lower piping system 23 connected to the lower frame 15 of the lower base arrangement 11 to channel fluid to or from the lower ends of the filter modules 14 and an upper piping system 24 connected to the upper frame 20 of the upper base arrangement 12 to channel fluid to or from the upper ends of the filter modules 14.

The piping system may be configured in a myriad of ways depending, for example, on the type of filtration provided by the filter modules and/or the auxiliary functions provided with the filter modules, e.g., liquid forward- or back-washing or gas cross scrubbing or blowback. The piping systems may also vary depending on the flow arrangement through the filter modules, e.g., whether the filter modules are arranged in a parallel arrangement, a series arrangement, or some parallel-series combination. For example, for cross-flow filtration the piping system may include pipes for supplying unfiltered fluid, e.g., feed or process fluid, to the filter modules, pipes for receiving filtered fluid, e.g., filtrate or permeate, from the filter modules, and pipes for receiving unfiltered fluid, e.g., retentate or concentrate, from filter modules arranged in parallel. The piping system may also include pipes for supplying cleaning solutions, including gas assisted cleaning solutions, to the feed side or the filtrate side of the filter modules.

In the illustrated embodiment, the filter modules 14 may provide a direct or dead-end type of filtration. Consequently, one of the lower and upper piping systems 23, 24, e.g., the lower piping system 23, may supply unfiltered fluid to one end, e.g., the lower end, of the filter modules 14, while the other of the lower and upper piping systems 23, 24, e.g., the upper piping system 24, may extract filtered fluid from the other end, e.g., the upper end, of the filter modules 14. Alternatively, the piping system may be associated with only one of the lower and upper base arrangements to both supply unfiltered fluid and receive filtered fluid from the same end of each filter module.

The pipes of the piping system may be fashioned, for example, from a polymeric material or a metal and may be attached to one or more of the lower base arrangement 11, the upper base arrangement 12, and the adjustable frame structure 13, for example, by welds and/or fasteners, including clamps. Further, the pipes may be arranged in any of numerous ways. For example, the piping system may include a feed manifold for directing unfiltered fluid to two or more filter modules and a filtrate manifold for collecting filtered fluid from two or more filter modules. For some embodiments, including the illustrated embodiment, one or more feed manifolds 25 of a lower piping system 23 may be attached to the lower frame 15 and may be fluidly coupled to the lower ends of two or more filter modules 14 to supply unfiltered fluid to the lower ends of the filter modules 14. Similarly, one or more filtrate manifolds 26 of an upper piping system 24 may be attached to the upper frame 20 and may be fluidly coupled to the upper ends of two or more filter modules 14 to extract filtered fluid from the upper ends of the filter modules 14. The lower piping system 23 may also include a distribution pipe 30 fluidly coupled to each of the feed manifolds 25. The distribution pipe 30 may be closed at one end and may have a fitting, e.g., a grooved pipe and clamp fitting or a flanged fitting, at the opposite open end. The distribution pipe 30 may be fluidly coupled via the fitting to a fluid system (not shown) which supplies unfiltered fluid to the distribution pipe 30, which, in turn, distributes unfiltered fluid to the feed manifolds 25 and, hence, to the lower ends of the filter modules 14. The upper piping system 24 may also include a collection pipe 31 fluidly coupled to each of the filtrate manifolds 26. The collection pipe 31 also may be closed at one end and have a fitting, e.g., a grooved pipe and clamp fitting or a flanged fitting, at the opposite open end and may be fluidly coupled via the fitting to the fluid system. The collection pipe 31 receives filtered fluid from the upper ends of the filter modules 14 via the filtrate manifolds 26 and delivers the filtered fluid to the filter system. In addition to variously arranged pipes, the piping system, including the lower and upper piping systems, may further include any of numerous valves, sensors, gauges, and other devices associated with the supply and removal of fluid to or from the filter modules.

The piping system and the plurality of mounts may be separate and distinct from one another, e.g., separately attached to the lower and/or upper base arrangements. However, for many embodiments, the plurality of mounts may be integrated with the piping system, either by being formed as part of the piping system or by being connected to the piping system. For example, each mount 16, 22 may be configured as a fitting on a manifold 25, 26 which both positions and supports one end of a filter module 14 and supplies or receives fluid to or from that end of the filter module 14. In the illustrated embodiment, each lower mount 16 may be configured as a feed inlet fitting connected to a feed manifold 25 and may have an opening that fluidly communicates between the feed manifold 25 and the end of the filter module 14. The feed inlet fitting positions and supports the lower end of a filter module 14, while passing feed fluid from the feed manifold 25 into the lower end of the filter module 14. Similarly, each upper mount 22 may be configured as a filtrate outlet fitting connected to a filtrate manifold 26 and may have an opening that fluidly communicates between the end of the filter module 14 and the filtrate manifold 26. The filtrate outlet fitting positions and supports the upper end of a filter module 14, while receiving filtrate from the upper end of the filter module 14 and passing the filtrate to the filtrate manifold 26. The mounts 16, 22 may be attached to the ends of the filter modules 14 by any of a variety of connectors, including, for example, clamps such as a grooved pipe and clamp fitting available under the trade designation Victaulic. In other embodiments, the piping system may be associated with only one base arrangement and an integrated mount may include two or more openings, allowing the mount to function as a header including both a feed inlet and a filtrate outlet.

Figure 3:
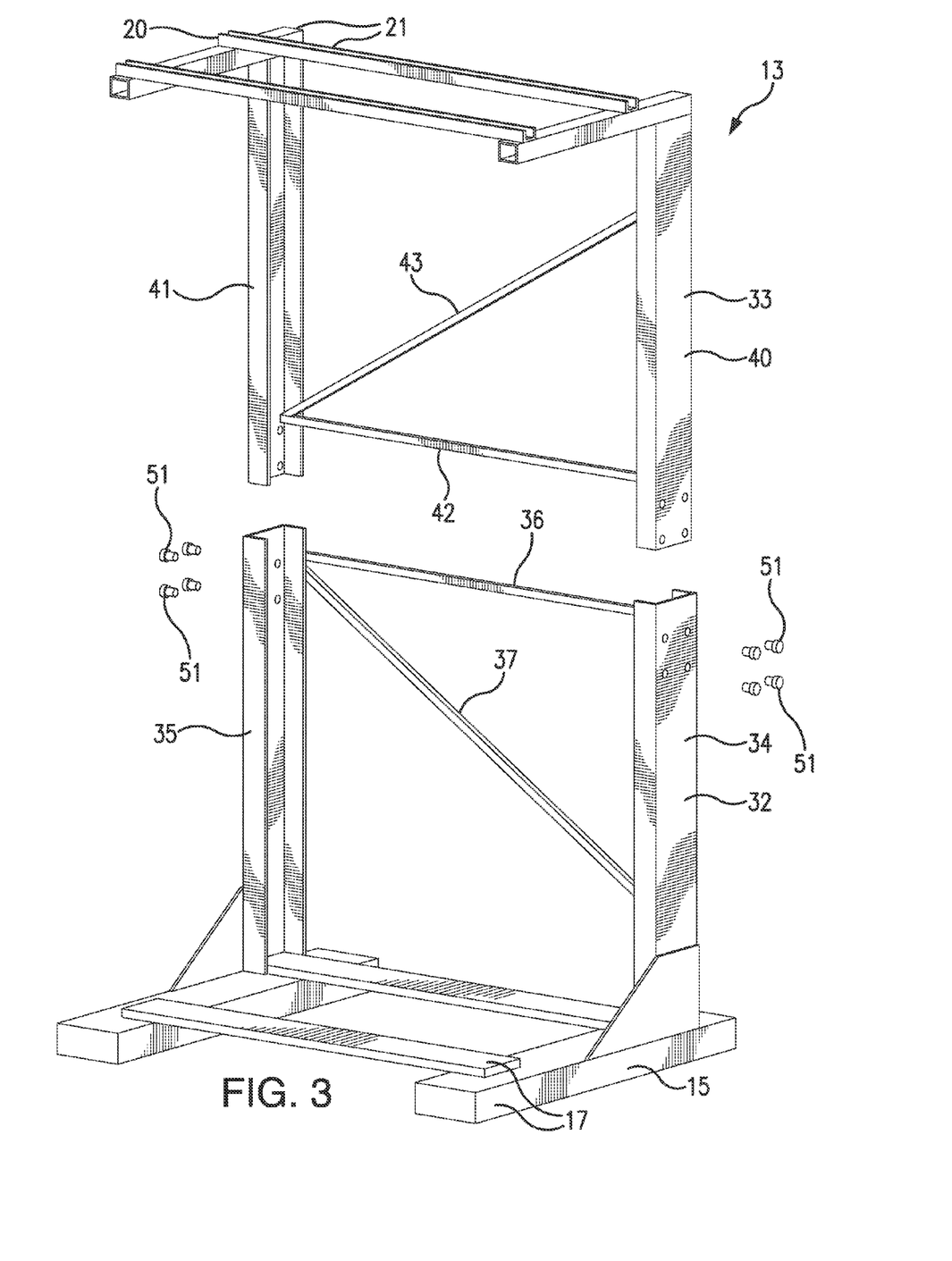
FIG. 3 is an exploded perspective view of an adjustable frame structure.

The adjustable frame structure may be configured in any of numerous ways. For many embodiments, the adjustable frame structure 13 may include lower and upper frame assemblages 32, 33, as shown in FIGS. 1-3. The lower frame assemblage 32 may be attached to the lower base arrangement 11 and the upper frame assemblage 33 may be attached to the upper base arrangement 12. For example, the frame assemblages 32, 33 may be rigidly attached to the respective base arrangements 11, 12 by welds or fasteners. The lower frame assemblage 32 may be moveably connected to the upper frame assemblage 33 in a variety of ways. For example, the upper frame assemblage 33 may be slideably connected to the lower frame assemblage 32, allowing the upper frame assemblage 33 to slide along the lower frame assemblage 32 as the adjustable frame structure 13 moves between linearly the first and second positions. In the illustrated embodiment, the upper frame assemblage 33 may be telescopically mounted to the lower frame assemblage 32.

Each of the lower and upper frame assemblages may be variously configured, either similar to or different from one another. In the illustrated embodiment, the lower frame assemblage 32 may comprise opposed elongate beams 34, 35. The beams 34, 35 may be attached, e.g., by welds, brackets, and/or fasteners, to opposite edges of the lower base arrangement 11, e.g., opposite edges of the lower frame 15, and may extend generally perpendicularly upwardly from the plane of the lower frame 15. A cross brace 36 attached to and extending between the beams 34, 35 near the top of the beams 34, 35 and a diagonal brace 37 attached to and extending between the beams 34, 35 beneath the cross brace 36 enhance the structural integrity of the lower frame assemblage 32. The upper frame assemblage 33 may also comprise opposed elongate beams 40, 41. The beams 40, 41 may be attached, e.g., by welds or fasteners, to opposite edges of the upper base arrangement 12. e.g., opposite edges of the upper frame 20, and may extend generally perpendicularly downwardly from the plane of the upper frame 20. Again, a cross brace 42 attached to and extending between the beams 40, 41 near the bottom of the beams 40, 41 and a diagonal brace 43 attached to and extending between the beams 34, 35 above the cross brace 42 enhance the structural integrity of the upper frame assemblage 33.

The beams of the lower and upper frame assemblages may be configured in a variety of ways to slide along one another between the first and second positions of the adjustable frame assembly. For example, the beams of the upper frame assemblage may be telescopically mounted to the beams of the lower frame assemblage. In the illustrated embodiment, the beams 34, 35; 40, 41 may each be a wide, generally U shaped channel element and may be dimensioned to allow the beams 40, 41 of the upper frame assemblage 33 to fit closely within and slide along the beams 34, 35 of the lower frame assemblage 32 between the first and second positions of the adjustable frame assembly 10. Alternatively, the lower and upper frame assemblages may be telescopically mounted to one another in other ways. For example, instead of opposed beams, the lower and upper frame assemblages may include central elongate posts, e.g., hollow square or circular posts, respectively attached to the lower and upper frames. The hollow post of the upper frame assemblage may be dimensioned to fit closely within and slide along the hollow post of the lower frame assembly between the first and second positions of the adjustable frame assembly.

Any of a wide variety of filter modules may be positioned on the adjustable frame assembly to form a filter apparatus, as shown, for example, in FIGS. 4 and 5. Generally, a filter module 13 may include a housing 44 having two or more ports. For example, the housing 44 may have a feed inlet port, e.g., at the lower end of the housing 44, and a filtrate outlet port, e.g., at the upper end of the housing 44. Additionally, the housing may include a retentate outlet port, a drainage port, a port for receiving or discharging a cleaning solution, and/or a variety of other ports. The filter module may be mounted to the adjustable frame assembly with the feed inlet port and the filtrate outlet port of the housing coupled to the piping system of the adjustable frame assembly. For example, in the illustrated embodiment, each filter module 13 may be mounted to the adjustable frame assembly 10 with the feed inlet port in the lower end of the housing 44 fluidly communicating with a feed manifold 25 of the lower piping system 23 via a lower mount 16 and with the filtrate outlet port in the upper end of the housing fluidly communicating with a filtrate manifold 26 of the upper piping system 24 via an upper mount 22.

Between the feed inlet port and the filtrate outlet port, the housing 44 of the filter module 10 may define a fluid flow path within the housing 44. The filter module 10 may further include a filter medium located in the housing 44 across the fluid flow path. Any of a wide variety of filter media may be located in the housing, including, for example, porous or permeable membranes or fibrous sheets that may be pleated or spirally or helically wound to form a filter element which may be located in the fluid flow path in the housing. For many embodiments, the filter medium may comprise one or more bundles of porous or permeable hollow fibers located in the fluid flow path in the housing. The filter medium serves to remove one or more undesirable substances from the fluid flowing through the filter medium and, therefore, may have any of numerous filtration characteristics. For example, the filter medium may have a removal rating in the range from ultraporous, nanoporous or finer to microporous or coarser.

A filter apparatus 50 including the adjustable frame assembly 10 and a plurality of filter modules 14, as shown in FIGS. 4 and 5, may be assembled in a variety of ways. For example, methods for assembling a filter apparatus 50 may include moving the adjustable frame structure 13 from a first position to a second position. The adjustable frame structure 13 is connected between the lower base arrangement 11 and the upper base arrangement 12, and in the first position of the adjustable frame structure 13, the lower base arrangement 11 may be spaced a smaller first distance from the upper base arrangement 12. This smaller first distance provides a more compact frame assembly 10 which can be stored and shipped more easily. The adjustable frame assembly may even be initially locked in this first position by any of a variety of mechanisms, including fasteners, e.g., bolts, or straps.

After unlocking the adjustable frame assembly from the first position, the adjustable frame structure may be moved to the second position in any of numerous ways. For example, the upper frame assemblage 33 may be slid along the lower frame assemblage 32 to the second position. In the illustrated embodiment, the upper and lower frame assemblages 33, 32 may slide along one another by telescopically sliding the beams 40, 41 of the upper frame assemblage 33 along the beams 34, 35 of the lower frame assemblage 32. The movement of the adjustable frame structure from the first position to the second position may be accomplished manually or, for larger frame assemblies, mechanically, e.g., by means of a fork lift. The adjustable frame structure may be locked in the second position by a variety of mechanisms. For example, the beams 34, 35 of the lower frame assemblage 32 may be bolted to the beams 40, 41 of the upper frame assemblage 33 by bolts 51, as shown in FIG. 4, once the adjustable frame structure 13 is in the second position. In the second position of the adjustable frame structure 13, the lower base arrangement 11 may be spaced a larger second distance from the upper base arrangement 12. This larger second distance may correspond to the height of the filter modules 14.

Methods for assembling a filter apparatus 50 may further include 1) positioning opposite ends of the plurality of filter modules 14 in the plurality of mounts 16, 22 on the lower and upper base arrangements 11, 12 when the adjustable frame structure 13 is in the second position and 2) connecting the piping system on at least one of the lower and upper base arrangements 11, 12 to the plurality of filter modules 14. Positioning the filter modules on the mounts and connecting the piping system to the filter modules may be done in a variety of ways. For example, where the mounts are separate and distinct from the piping system, the filter modules may first be positioned on the mounts and later the piping system may be connected to the filter modules. Alternatively, where the mounts are integrated with the piping system, the filter modules may be positioned on the mounts and connected to the piping system at nearly the same time. Further, where the piping system is associated with only one of the lower and upper base arrangements, the piping system may be connected to only one end of each filter module. Alternatively, where the piping system is associated with both the lower and upper base arrangements, the piping system may be connected to both ends of each filter module.

In the illustrated embodiment, after the adjustable frame structure 13 is moved to the second position, the frame assemblages 32, 33 may be locked to one another, e.g., bolted to one another, and the ends of the filter modules 14 may be positioned in the lower and upper integrated mounts 16, 22. Seals and connectors, e.g., O-ring seals and grooved-pipe type connectors, may be associated with the mounts 16, 22 and/or the ends of the filter modules 14 to seal and secure the filter modules 14 in place between the lower and upper base arrangements 11, 12. With the filter modules 14 sealed and secured to the adjustable frame structure 10, the resulting filter apparatus 50 may be connected to a filter system (not shown).

Additionally, methods for assembling a filter apparatus may include training two or more filter apparatuses together. For example, two or more adjustable frame assemblies may be physically located close to one another or even physically joined to one another in any of a variety of ways. The filter modules of all of the trained filter apparatuses may then be fluidly connected to the fluid system in any of numerous ways, including, for example, in a parallel arrangement.

Figure 6:
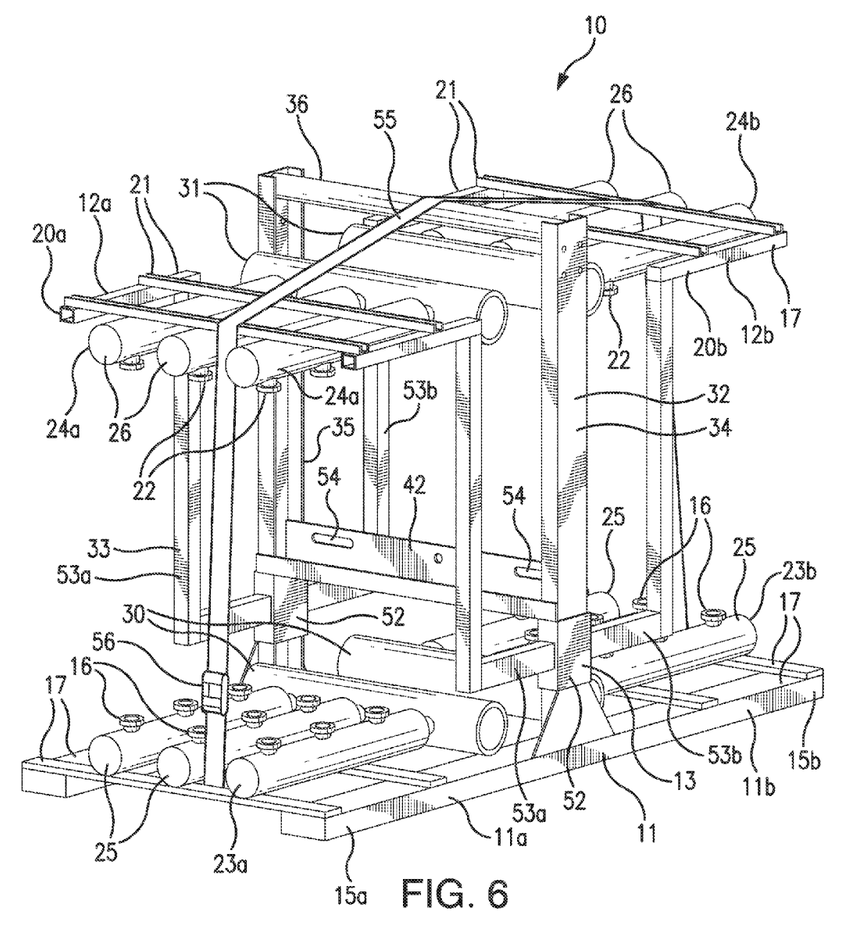
FIG. 6 is a perspective view of another embodiment of an adjustable frame assembly in a first position.
Figure 7:
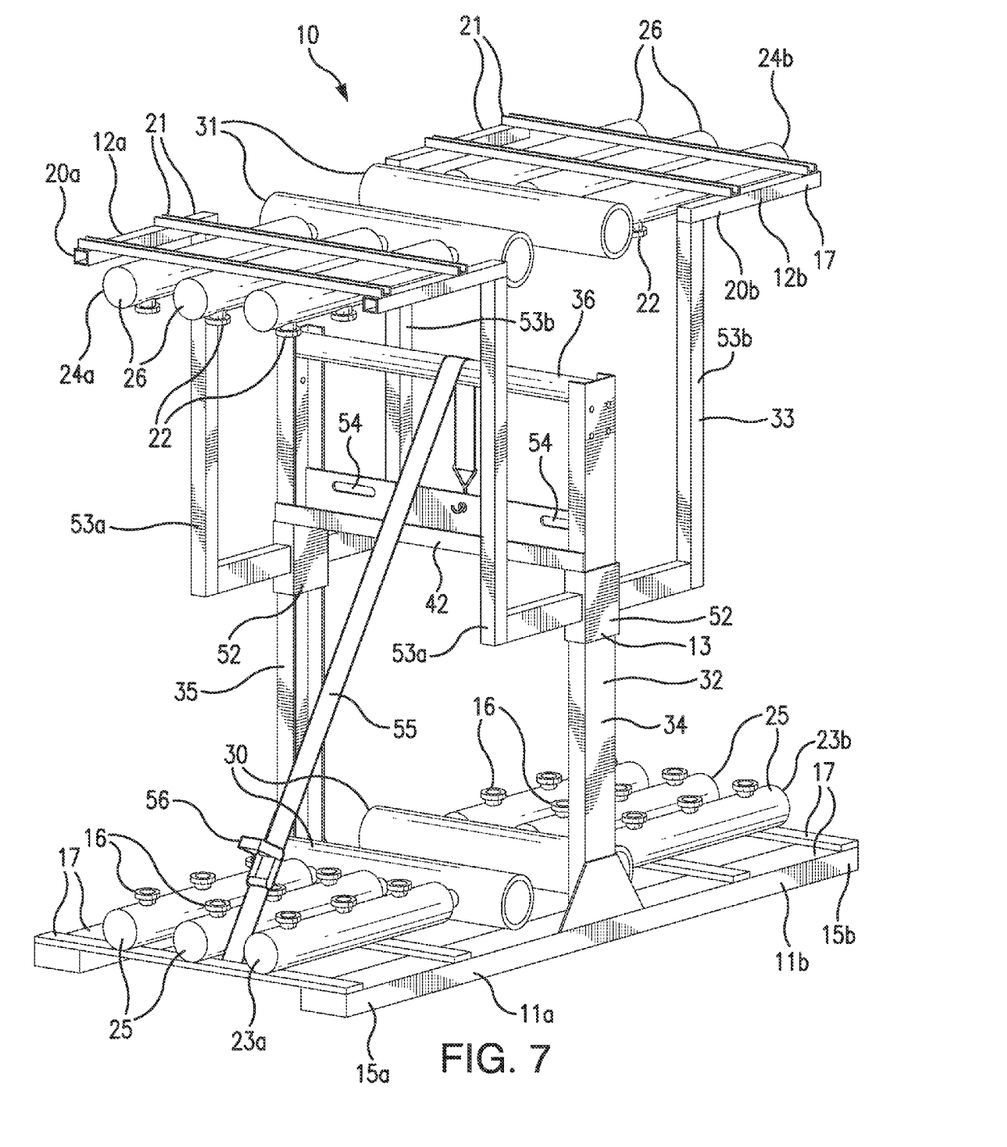
FIG. 7 is a perspective view of the adjustable frame assembly of FIG. 6 moving toward a second position.

Another embodiment of an adjustable frame assembly 10 is shown in FIGS. 6 and 7. Again, the adjustable frame assembly 10 includes a lower base arrangement, an upper base arrangement, and an adjustable frame structure connected between the lower and upper base arrangements. The adjustable frame structure is moveable between a first position in which the lower and upper base arrangements are spaced a smaller first distance apart and a second position in which the lower and upper base arrangements are spaced a second greater distance apart. The adjustable frame assembly 10 shown in FIGS. 6 and 7 may be fashioned from many of the same materials as the adjustable frame assembly 10 shown in FIGS. 1 and 2.

The lower and upper base arrangements of FIGS. 6 and 7 may be similar to those of FIGS. 1 and 2, except each base arrangement in FIGS. 6 and 7 includes first and second base sections 11a, 11b; 12a, 12b. The base sections may be similar to or different from one another. In the illustrated embodiment, the lower base sections 11a, 11b may be similar to one another and generally coplanar. The upper base sections 12a, 12b may also be similar to one another and generally coplanar. Each lower base section 11a, 11b may include a lower frame 15a, 15b fashioned from lower frame elements 17 and a plurality of lower mounts 16 attached to the lower frame 15a, 15b, as previously described. Each upper base section 12a, 12b may include an upper frame 20a, 20b fashioned from upper frame elements 21 and a plurality of upper mounts 22 attached to the upper frame 20a, 20b, as previously described.

At least one of the lower and upper base arrangements may include a piping system. For some embodiments, including the illustrated embodiment, each base section 11a, 11b; 12a, 12b may include a piping system 23a, 23b; 24a, 24b and all of the piping systems 23a, 23b; 24a, 24b may be similar to one another. For example, each lower piping system 23a, 23b may be attached to the lower frame 15a, 15b and may include a distribution pipe 30 fluidly coupled to feed manifolds 25, as previously described. Each upper piping system 24a, 24b may be connected to an upper frame 20a, 20b and may include a collection pipe 31 fluidly coupled to filtrate manifolds 26, as previously described. Although the mounts and the piping system may be separate and distinct from one another, in the illustrated embodiment the lower mounts 16 may be integrated with the lower piping system 23a, 23b and the upper mounts 22 may be integrated with the upper piping system 24a, 24b, as previously described.

The adjustable frame structure 13 of FIGS. 6 and 7 may be similar to the adjustable frame structure 13 of FIGS. 1-3. For example, the adjustable frame structure 13 of FIGS. 6 and 7 may include lower and upper frame assemblages 32, 33 moveably connected, e.g., slidingly mounted, to one another to move between the first position and the second position. The lower frame assemblage 32 may be connected between the first and second lower base sections 11a, 11b and may comprise opposed elongate beams 34, 35 attached to opposite edges of the lower base arrangement 11 and extending generally perpendicularly upwardly from the plane of the lower base sections 11a, 11b, as previously described. A cross brace 36 may be attached at the top of the beams 34, 35 and may extend between the beams 34, 35. For some embodiments, the cross brace 36 may have a generally rounded cross section, e.g., may be a cylindrical pipe.

The upper frame assemblage 33 of FIGS. 6 and 7 may be different from the upper frame assemblage 33 of FIGS. 1-3. For example, the upper frame assemblage 33 may be connected between the first and second upper base sections 12a, 12b and may comprise opposed short brackets 52 moveably mounted around the beams 34, 35 of the lower frame assemblage 32. For example, the brackets 52 may be mounted to slide along the exterior of the beams 34, 35 of the lower frame assemblage 32. Struts, for example, generally L-shaped struts 53a, 53b, may extend generally upwardly in opposite directions from each bracket 52 and may be attached, e.g., welded or bolted, to the bracket 52 on one end and an upper base section 12a, 12b, e.g., an upper frame 20a, 20b, on the other end. For some embodiments, the struts 53a, 53b and the beam 34, 35 on each side of the adjustable frame structure 13 may be generally coplanar. A cross brace 42 may be attached to, and extend between, the brackets 52.

The adjustable frame structure 10 of FIGS. 6 and 7 may be moved from a first position, in which the lower and upper base arrangements, e.g., the lower and upper base sections 11a, 11b; 12a, 12b, are spaced a smaller first distance apart, as shown in FIG. 6, to a second position, in which the lower and upper base arrangements, e.g., the lower and upper base sections 11a, 11b; 12a, 12b, are spaced a larger second distance from one another. In the first position, the adjustable frame assembly 10 is compact and easily shippable. In the second position, the distance between the lower and upper base sections 11a, 11b; 12a, 12b may correspond to the height of the filter modules (not shown). The filter modules may be mounted to the adjustable frame assembly 10 to form a filter apparatus (not shown) with the ends of the filter modules positioned in and supported by the mounts 16, 22 and the piping system, e.g., the lower and upper piping systems 23a, 23b; 24a, 24b of the lower and upper base sections 11a, 11b; 12a, 12b, fluidly coupled between the filter modules and a fluid system (not shown). In the illustrated embodiment, all of the filter modules may be connected in parallel to the filter system. In other embodiments, filter apparatus may be arranged such that the filter modules positioned between the one set of corresponding lower and upper base sections may be fluidly coupled in series with the filter modules positioned between the other set of corresponding lower and upper base sections.

The adjustable frame assembly 10 of FIGS. 6 and 7 may be larger than the adjustable frame assembly 10 of FIGS. 1-3 and a mechanical mechanism for moving, e.g., sliding, the adjustable frame structure 13 from the first position to the second position may be helpful. For example, the cross brace 36 on the upper frame assemblage 33 may include two laterally spaced oblong openings 54, allowing a fork lift to engage and lift the upper frame assemblage 33 to the second position, sliding the brackets 52 upwardly along the beams 34, 35. Alternatively or additionally, a strap mechanism including a strap 55 and a strap ratchet 56 coupled to the strap 55 may be used to lift the upper frame assemblage 33 from the first position to the second position. The strap mechanism may be connected to one or more of the adjustable frame structure, the lower base arrangement, and the upper base arrangement to move the second frame assemblage along the first frame assemblage to the second position. For example, with the adjustable frame assembly 10 in the first position, the strap 55 may be connected at one end to a lower base section 11a, extended over the rounded cross brace 36 of the lower frame assemblage 32, and connected to the cross brace 42 of the upper frame assemblage 33. Operating the strap ratchet 56 shortens the strap 55 and slides the brackets 52 upwardly along the beams 34, 35, thereby pulling the upper frame assemblage 33 up to a second position. In the second position, the upper frame assemblage 33 may be locked to the lower frame assemblage 32, for example, by bolting the brackets 52 to the beams 34, 35.

The strap mechanism may also be connected to one or more of the adjustable frame structure, the lower base arrangement, and the upper base arrangement to lock the adjustable frame assembly in the first position. For example, as shown in FIG. 6, the strap 55 may be connected at one end to one edge of the lower base arrangement 11a, extended over the top of the upper base arrangement 12a, 12b and the adjustable frame structure 13, and connected at the other end to an opposite edge of the lower base arrangement 11b. The strap ratchet 56 may then be tightened to lock the adjustable frame assembly 10 in the first position. A similar strap mechanism may be arranged with the adjustable frame assembly of FIGS. 1-5 and used to lock the frame assembly in the first position and/or lift the upper frame assemblage along the lower frame assemblage from the first position to the second position.

While various aspects of the invention have been described and/or illustrated with respect to several embodiments, the invention is not limited to these embodiments. For instance, one or more features of these embodiments may be eliminated or modified or one or more features of one embodiment may be combined with one or more features of other embodiments without departing from the scope of the invention. Even embodiments with very different features may be within the scope of the invention.

Thus, the present invention includes all embodiments, modifications, and features that may fall within the scope of the invention.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as," "for example", or "e.g.") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An adjustable frame assembly for a plurality of filter modules, the adjustable frame assembly comprising:
   a lower base arrangement and an upper base arrangement, each of the base arrangements including a plurality of mounts arranged to receive one end of a plurality of filter modules and at least one of the base arrangements including a piping system arranged to channel fluid to or from an end of the plurality of filter modules, wherein the piping system includes a first manifold coupleable to two or more of the filter modules to distribute fluid to the filter modules and a second manifold coupleable to two or more of the filter modules to collect fluid from the plurality of filter modules; and
   an adjustable frame structure connected between the lower base arrangement and the upper base arrangement, the adjustable frame structure being moveable between a first position, wherein the lower and upper base arrangements are spaced a first distance, and a second position, wherein the lower and upper base arrangements are spaced a second distance greater than first distance, the second distance corresponding to a height of the plurality of filter modules and allowing the plurality of filter modules to be positioned on the mounts of the lower and upper base arrangements and coupled to the piping system.

2. The adjustable frame assembly of claim 1 wherein the piping system includes a lower piping system supported by the lower base arrangement and an upper piping system supported by the upper base arrangement.

3. The adjustable frame assembly of claim 1 wherein the piping system is supported on the lower base arrangement, wherein the lower base arrangement includes first and second base sections laterally spaced from one another, the plurality of mounts including a first group of mounts on the first base section and a second group of mounts on the second base section and the piping system including a first piping system supported by the first base section and a second piping system supported by the second base section, and wherein the adjustable frame structure is connected to the lower base arrangement between the first base section and the second base section.

4. The adjustable frame assembly of claim 1 wherein the piping system is supported on the upper base arrangement, wherein the upper base arrangement includes first and second base sections laterally spaced from one another, the plurality of mounts including a first group of mounts on the first base section and a second group of mounts on the second base section and the piping system including a first piping system supported by the first base section and a second piping system supported by the second base section, and wherein the adjustable frame structure is connected to the upper base arrangement between the first base section and the second base section.

5. The adjustable frame assembly of claim 1 wherein one of the first and second manifolds is supported by the lower base arrangement and the other of the first and second manifolds is supported by the upper base arrangement.

6. The adjustable frame assembly of claim 1 wherein the mounts are integrated with the piping system and the piping system is coupleable to the ends of the filter modules via the mounts.

7. The adjustable frame assembly of claim 1 wherein the adjustable frame structure includes a first frame assemblage connected to the lower base arrangement and a second frame assemblage connected to the upper base arrangement, the second frame assemblage being moveable along the first frame assemblage between the first and second positions of the adjustable frame structure.

8. The adjustable frame assembly of claim 7 wherein the second frame assemblage is slideably mounted to the first frame assemblage.

9. The adjustable frame assembly of claim 8 wherein the second frame assemblage is telescopically mounted to the first frame assemblage.

10. The adjustable frame assembly of claim 7 further comprising a strap mechanism including a flexible strap and a strap ratchet coupled to the flexible strap, wherein the strap mechanism is connected to one or more of the adjustable frame structure, the lower base arrangement, and the upper base arrangement and arranged to move the second frame assemblage along the first frame assemblage between the first and second positions of the adjustable frame structure.

11. The adjustable frame assembly of claim 7 further comprising a strap mechanism including a flexible strap connected to one or more of the adjustable frame structure, the lower base arrangement, and the upper base arrangement and arranged to lock the second frame assemblage to the first frame assemblage in the first position of the adjustable frame structure.

12. The adjustable frame assembly of claim 1 further comprising:
the plurality of filter modules, each filter module having opposite ends and a height corresponding to the second distance, wherein one end of each filter module is positioned in one of the mounts of the lower base arrangement and the other end of the filter module is positioned in one of the mounts of the upper base arrangement and wherein the piping system is coupled to the plurality of filter modules to channel fluid to or from the plurality of filter modules.

13. A method for assembling a filter apparatus comprising a plurality of filter modules, the method comprising:
moving an adjustable frame structure of an adjustable frame assembly comprising a lower base arrangement and an upper base arrangement, each of the base arrangements including a plurality of mounts arranged to receive one end of the plurality of filter modules and at least one of the base arrangements including a piping system arranged to channel fluid to or from an end of the plurality of filter modules, wherein the piping system includes a first manifold coupleable to two or more of the filter modules to distribute fluid to the filter modules and a second manifold coupleable to two or more of the filter modules to collect fluid from the plurality of filter modules;
wherein the adjustable frame structure is connected between the lower base arrangement and the upper base arrangement from a first position, wherein the lower base arrangement is spaced a first distance from the upper base arrangement, to a second position, wherein the lower base arrangement is spaced a greater second distance from the upper base arrangement, the second distance corresponding to a height of the plurality of filter modules;
positioning opposite ends of a plurality of filter modules in the plurality of mounts on the lower and upper base arrangements when the adjustable frame structure is in the second position; and
connecting the piping system on at least one of the lower and upper base arrangements to the plurality of filter modules.

14. The method of claim 13 wherein connecting the piping system includes connecting a lower piping system on the lower base arrangement to one end of the plurality of filter modules and connecting an upper piping system on the upper base arrangement to another end of the plurality of filter modules.

15. The method of claim 13 wherein connecting the piping system to the plurality of filter modules includes positioning the ends of the filter modules in the plurality of mounts integrated with the piping system.

16. The method of claim 13 wherein moving the adjustable frame structure between the first and second positions includes sliding a second frame assemblage of the adjustable frame structure along a first frame assemblage of the adjustable frame structure.

17. The method of claim 16 wherein moving the adjustable frame structure includes operating a strap ratchet coupled to a flexible strap which is connected to one or more of the adjustable frame structure, the lower base arrangement, and the upper base arrangement, wherein operating the strap ratchet includes sliding the second frame assemblage of the adjustable frame structure along the first frame assemblage of the adjustable frame structure between the first and second positions.

18. The method of claim 13 further comprising unlocking the adjustable frame structure from a locked first position prior to moving the adjustable frame structure between the first and second positions.

19. The method of claim 18 wherein unlocking the adjustable frame structure includes detaching a strap from one or more of the adjustable frame structure, the lower base member, and the upper base member.

* * * * *